US010072654B2

(12) United States Patent
Offenburger et al.

(10) Patent No.: US 10,072,654 B2
(45) Date of Patent: Sep. 11, 2018

(54) ELECTRICALLY CONTROLLED PRESSURE CONTROL VALVE FOR AN ADJUSTABLE HYDROSTATIC PUMP

(71) Applicant: Robert Bosch GmbH, Stuttgart (DE)

(72) Inventors: Johannes Offenburger, Dundee (GB); Carola Diebold, Eutingen (DE); Friedemann Nordt, Eutingen (DE)

(73) Assignee: Robert Bosch GmbH, Stuttgart (DE)

( * ) Notice: Subject to any disclaimer, the term of this patent is extended or adjusted under 35 U.S.C. 154(b) by 324 days.

(21) Appl. No.: 14/625,309

(22) Filed: Feb. 18, 2015

(65) Prior Publication Data
US 2015/0240961 A1    Aug. 27, 2015

(30) Foreign Application Priority Data

Feb. 18, 2014 (DE) .......................... 10 2014 202 905
Dec. 18, 2014 (DE) .......................... 10 2014 226 378

(51) Int. Cl.
*F16K 15/06* (2006.01)
*F04B 53/10* (2006.01)
(Continued)

(52) U.S. Cl.
CPC .............. *F04B 53/109* (2013.01); *F04B 1/30* (2013.01); *F04B 1/324* (2013.01);
(Continued)

(58) Field of Classification Search
CPC .......... F04B 1/324; F04B 53/109; F04B 1/30; F04B 27/1804; F16K 31/0613;
(Continued)

(56) References Cited

U.S. PATENT DOCUMENTS 4,491,153 A * 1/1985 Bartholomaus .... G05D 16/2013
137/116.3
4,810,171 A * 3/1989 Krebs .................. F16H 61/433
417/218
(Continued)

FOREIGN PATENT DOCUMENTS

DE     199 49 169 A1    4/2001
DE     100 01 826 C1    9/2001

OTHER PUBLICATIONS

Bosch Rexroth Corporation, Data Sheet, Axial Piston Variable Pump (A) A10VSO (US-Version), RA-A 92711, p. 10/44 (44 pages).
(Continued)

Primary Examiner — Essama Omgba
Assistant Examiner — Stephen Mick
(74) Attorney, Agent, or Firm — Maginot, Moore & Beck LLP

(57) ABSTRACT

An electroproportional pressure control valve of cartridge-type construction is screwed into a housing bore of a hydrostatic pump. The cartridge includes an adjusting pressure port, a pump port, and a tank port. The adjusting pressure port is relieved to the tank port in a normal position of a spring-biased valve plunger of the pressure control valve. A connection from the pump port to the adjusting pressure port is opened counter to the force of the spring by increasing a current of an electromagnet and increasing the pump pressure at the pump port. The spring, the electromagnet, and the resultant force of the pump pressure act along a common axis of movement of the valve plunger. A first nozzle connects the adjusting pressure port to an adjusting pressure chamber. A second nozzle connects the adjusting pressure port to the tank port.

12 Claims, 3 Drawing Sheets

(51) Int. Cl.
  *F04B 1/32* (2006.01)
  *F04B 27/18* (2006.01)
  *F04B 1/30* (2006.01)
  *F16K 31/06* (2006.01)

(52) U.S. Cl.
  CPC ...... *F04B 27/1804* (2013.01); *F16K 31/0613* (2013.01); *Y10T 137/86622* (2015.04); *Y10T 137/86702* (2015.04)

(58) Field of Classification Search
  CPC ....... Y10T 137/7925; Y10T 137/86622; Y10T 137/86702
  USPC ...................................... 417/222.2
  See application file for complete search history.

(56) References Cited

U.S. PATENT DOCUMENTS

| | | | | |
|---|---|---|---|---|
| 7,073,533 B2 * | 7/2006 | Bruck | ................ | G05D 16/2013 137/625.65 |
| 2006/0251526 A1 * | 11/2006 | Belser | .................... | F04B 1/324 417/269 |
| 2007/0169826 A1 * | 7/2007 | Hillesheim | ........ | G05D 16/2093 137/625.64 |
| 2014/0103233 A1 * | 4/2014 | Sewcz | .................... | F04B 49/22 251/12 |

OTHER PUBLICATIONS

Bosch Rexroth Corporation, Data Sheet, Proportional Pressure Reducing Valve, Direct Operated, RE 64658/02.10, 12 pages.

* cited by examiner

ELECTRICALLY CONTROLLED PRESSURE CONTROL VALVE FOR AN ADJUSTABLE HYDROSTATIC PUMP This application claims priority under 35 U.S.C. § 119 to patent application nos. DE 10 2014 202 905.8, filed Feb. 18, 2014 in Germany, and DE 10 2014 226 378.6, filed Dec. 18, 2014 in Germany, the disclosures of which are incorporated herein by reference in their entirety.

BACKGROUND

The disclosure relates to an electrically controlled pressure control valve for an adjustable hydrostatic pump and to a hydrostatic pump therewith.

The adjustment of the delivery volume of hydrostatic pumps can be accomplished with an adjusting pressure medium, with which an adjusting cylinder of a pivoted cradle of an axial piston pump can be supplied and filled, for example. In this case, a control valve controls the connection of an adjusting pressure medium source to the adjusting cylinder.

As feedback of the (achieved) adjustment to this control valve, there is a known practice in the prior art, following a first principle, of providing travel or force feedback from the adjusting device (e.g. the adjusting cylinder) to the control valve. As a result, the control valve is influenced in such a way with increasing adjustment and thus an increasing delivery volume of the pump that the adjusting pressure medium is throttled and the adjustment is reduced or stopped.

Publications DE 100 01 826 C1 and DE 199 49 169 C2 show control valves of this kind which are each designed as cartridges and the respective longitudinal axes of which coincide with the longitudinal axis of an adjusting piston of the adjusting cylinder. In this case, feedback of the travel of the adjusting piston, which is converted into a force by an interposed spring, is implemented.

In the case of pressure control valves for adjustable hydrostatic pumps, there is a known practice in the prior art, following a second principle, of connecting the pressure control valve to the high pressure side of the pump to be controlled in order to detect the working pressure thereof and feed it back to the pressure control valve. In this case, the working pressure acts on the valve body of the pressure control valve in the direction of a reduction in the delivery volume and hence in the pressure of the pump (feedback of the working pressure of the pump).

The adjusting pressure medium which is necessary to supply the adjusting device of the pump can furthermore be tapped from the working line of the pump and throttled by means of the pressure control valve in accordance with the desired adjustment of the pump and fed to the adjusting cylinder.

The publication by the applicant, RD 9 2711/01.12 A10VSO, shows a pressure control valve of this kind with feedback of the working pressure to the pump to be controlled on page 11/48. The pressure control valve acts as a pressure limiter for the working pressure of the pump. For this purpose, a spring acts on the valve body of the pressure control valve in the direction of an increase in the delivery volume of the pump. The maximum pump working pressure to be established can be set by setting the preloading of the spring.

On page 15/48, the same publication by the applicant shows a pressure control valve arrangement in which an electrically actuated pilot control valve is added to the main pressure control valve, by means of which pilot control valve it is possible to set a control pressure that acts together with the spring on the valve body of the main pressure control valve in the direction of an increase in the delivery volume of a pump. An electrically controlled pressure control valve arrangement is thereby created in which an increase in the current his electromagnet causes a pressure reduction in the control pressure and hence movement of the valve body of the main pressure control valve in the direction of a reduction in the delivery volume and hence a reduction in the working pressure of the pump. The electrically actuated pressure control valve arrangement thus has a negative characteristic, which sets a maximum delivery volume of the pump in the event of a power failure at the electromagnet (fail safe).

The disadvantage with the last-mentioned electrically controlled pressure control valve arrangements is that the outlay in terms of equipment and the installation space requirement are high since this involves a combination of the main pressure control valve and of the additional electrically controlled pilot control valve.

Given this situation, it is the underlying object of the disclosure to provide an electrically controlled pressure control valve for hydrostatic pumps and a hydrostatic pump, the outlay for which in terms of equipment and the installation space requirement are reduced.

SUMMARY

This object is achieved by an electrically controlled pressure control valve for a hydrostatic pump having the features of the disclosure and by a hydrostatic pump having the features of disclosure.

The pressure control valve is suitable for controlling the pressure of a hydrostatic pump of adjustable displacement and is designed as a continuously adjustable 3/2-way valve which has an adjusting pressure port, a pump port and a tank port. In a normal position, preloaded by a spring, of a valve body, the adjusting pressure port is relieved to the tank port. The valve body can be moved and hence a connection from the pump port to the adjusting pressure port can be opened counter to the force of the spring by increasing a current of an electromagnet and increasing the pump pressure at the pump port. In the event of a power failure, maximum pump pressure is established or set (negative characteristic). Since, according to the disclosure, this is a directly electrically controlled pressure control valve without a pilot control stage, the outlay in terms of equipment and the installation space requirement are reduced. The standby pressure and the consumption of adjusting pressure medium or control pressure medium are furthermore reduced.

The force of the spring, the resultant pump pressure acting in the direction of movement of the valve body, and the force of the electromagnet preferably act along a common axis of movement, which coincides with a longitudinal axis of the valve body. Rotational symmetries which are advantageous in terms of manufacturing and assembly are thereby obtained.

In a particularly preferred embodiment, the housing is designed as a screw-in cartridge, in which the valve body is arranged in a rotationally symmetrical manner and into which the three ports are introduced laterally. The sequence of the ports, when viewed from the electromagnet, is preferably first of all the tank port, then the pump port and finally the adjusting pressure port. A radial step of the housing is provided between the pump port and the adjusting pressure port.

In a preferred development of compact construction, the pressure control valve is a differential pressure valve (in respect of the pump pressure). For this purpose, the valve body is a valve plunger guided in a valve bore, wherein a pump pressure chamber is delimited by a larger collar and by a smaller collar of the valve plunger. The larger collar acts in the direction of the connection from the pump port to the adjusting pressure port, while the smaller collar acts counter to this. In the region of the pump pressure chamber, the valve bore can have a radial step, which corresponds to the difference in size of the two collars. The valve plunger can then have a uniform diameter in the region between the two collars. Or, in the region between the two collars, the valve plunger has a change in diameter corresponding to the difference in size between the two collars.

There is a preference here, with a view to a falling characteristic of the pressure control valve according to the disclosure, if the pump pressure on the larger collar and the force of the electromagnet act counter to the pump pressure on the smaller collar and the force of the comparatively strong spring. Increasing the current of the electromagnet thus brings about a proportional reduction in the pump pressure—at least over a partial range of possible current values.

In a preferred development, a nozzle is provided between an adjusting pressure chamber of the housing and the adjusting pressure port. For this purpose, a radial channel, into which the nozzle is inserted—e.g. screwed—can be made in the housing. Part of the channel can form the adjusting pressure chamber.

In a preferred development, a further nozzle is provided between the adjusting pressure port and the tank port.

It is a simple matter in terms of equipment to insert—e.g. screw—this into the radial step of the housing in an axial direction relative to the valve body. The further nozzle is preferably inserted into an axial channel which, together with a radial channel section, connects the radial step to a circumferential region of the housing in which the tank port is also formed.

In a particularly preferred development, the force of the spring can be adjusted by means of a closure screw, which is screwed into an end, remote from the electromagnet, of the housing, preferably concentrically with the latter.

If the valve body has a longitudinal bore via which a tank pressure chamber and a spring chamber located at the end are connected to one another, the valve plunger can be moved with little resistance. The spring chamber can be closed by the closure screw.

The pump according to the disclosure has a housing bore, into which a pressure control valve as described above is inserted—preferably screwed.

In this case, the saving in terms of installation space through the compactness of the pressure control valve according to the disclosure is relevant especially in the case of comparatively small axial piston pumps of swashplate-type construction, wherein the housing bore is positioned obliquely to the drive shaft and cylinder barrel.

In a development of particularly compact construction, an adjusting piston, which is coupled to a swashplate, is also guided in the housing bore. The housing bore thus serves as an adjusting cylinder bore, wherein the adjusting piston and the housing of the pressure control valve delimit an adjusting pressure chamber.

A further reduction in the installation space is achieved if the adjusting piston is of cup-shaped configuration and, at the maximum pivoting angle, surrounds that end of the housing of the pressure control valve which is remote from the electromagnet.

BRIEF DESCRIPTION OF THE DRAWINGS

An illustrative embodiment of the disclosure is described in detail below with reference to the figures, in which.

DETAILED DESCRIPTION

Figure 1:
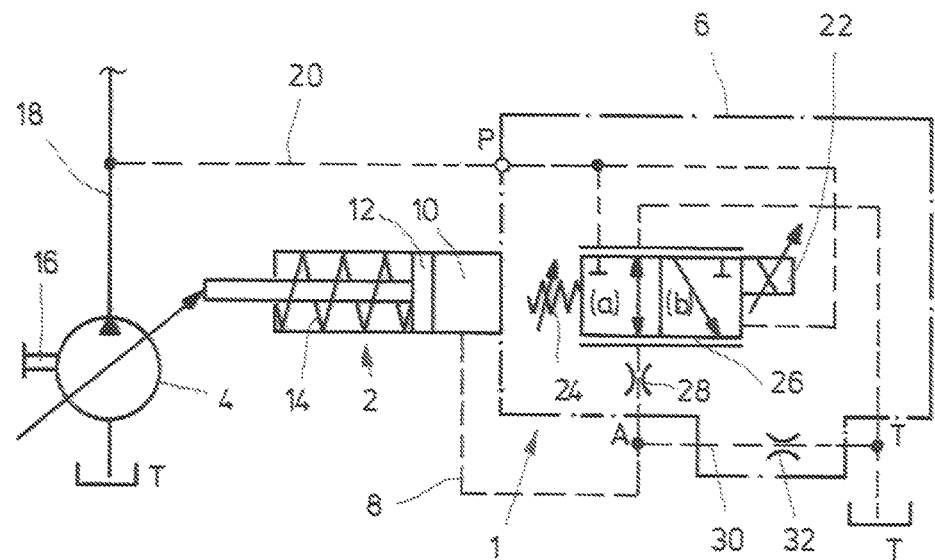
FIG. 1 shows a circuit diagram of the illustrative embodiment of the pressure control valve according to the disclosure with a pump and the adjusting device thereof.

FIG. 1 shows a circuit diagram of the illustrative embodiment of the directly controlled pressure control valve 1 according to the disclosure for supplying an adjusting cylinder 2 of an adjustable hydrostatic axial piston pump 4. For this purpose, an adjusting pressure port A, which is arranged on a housing 6 of the valve, is connected by an adjusting pressure line 8 to an adjusting pressure chamber 10 of the adjusting cylinder 2. Filling of the adjusting pressure chamber 10 with adjusting pressure medium brings about movement of an adjusting piston 12 counter to the force of an adjusting spring 14, thereby reducing the delivery volume and hence indirectly the working pressure of the axial piston pump 4.

The axial piston pump 4 is driven by means of a drive shaft 16 and pumps pressure medium out of a tank T into a working line 18. The working line 18 is connected to a pump port P of the pressure control valve 1 by a control and adjusting pressure channel 20. In the interior of the housing 6, the pump pressure prevailing in the control and adjusting pressure channel 20, together with an electrically actuated electromagnet 22, acts on the valve plunger 26 of the pressure control valve 1 counter to the adjustable force of a spring 24. In a normal position a of the valve plunger 26, said position being preloaded by the spring 24, the adjusting pressure port A is relieved to a tank port T via a first nozzle 28, allowing the adjusting spring 14 to adjust the axial piston pump 4 to maximum delivery volume. If the force of the electromagnet 22 increases and/or the pump pressure at the pump port P increases, the valve plunger 26 is moved into one of the positions b, allowing adjusting pressure medium to pass from the pump port P to the adjusting pressure port A via the first nozzle 28. The adjusting pressure chamber 10 of the adjusting cylinder 2 is thus filled and the axial piston pump 4 is pivoted back.

The adjusting pressure port A is connected to the tank port T by a channel 30, wherein a second nozzle 32 is provided in the channel 30.

Figure 2:
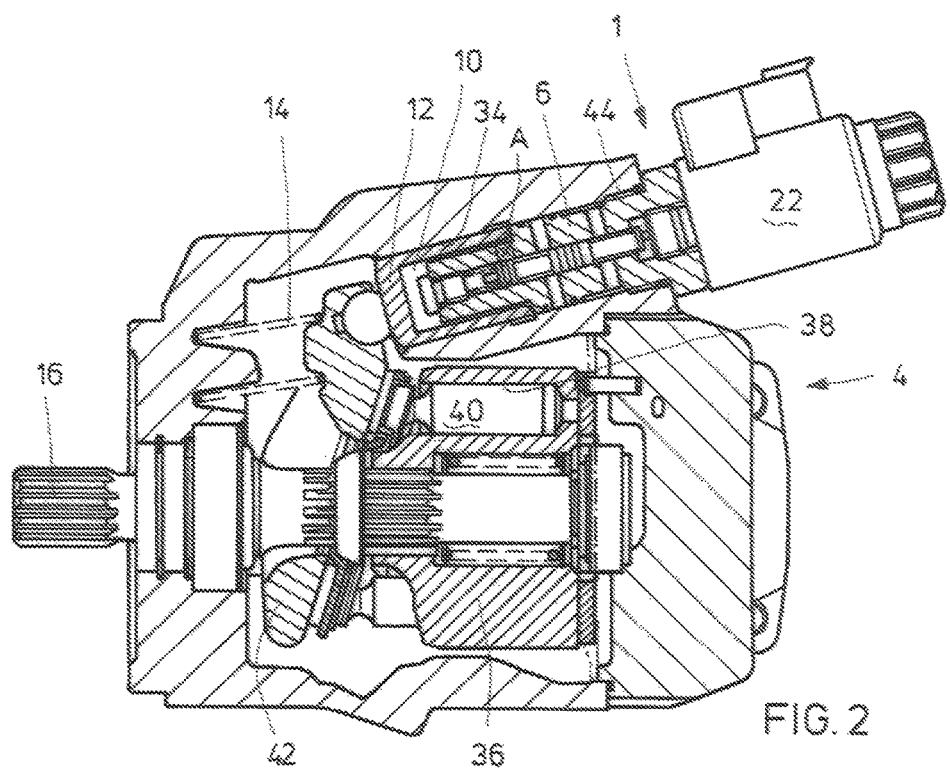
FIG. 2 shows the illustrative embodiment of the pressure control valve according to the disclosure with the pump according to FIG. 1 in a longitudinal section.

FIG. 2 shows the illustrative embodiment of the pressure control valve 1 according to the disclosure, which is inserted into a housing bore 34 of the axial piston pump 4. In the manner known from the prior art, the axial piston pump 4 has a cylinder barrel 36, in the cylinder bores 38 of which respective pistons 40 are guided. Since the pistons 40 are pressed via the piston feet thereof against a nonrotating swashplate 42 positioned obliquely to the drive shaft 16 as they revolve with the cylinder barrel 36, they perform respective working strokes and pump working pressure medium into the working line 18 (cf. FIG. 1).

To adjust the pivoting angle of the swashplate 42, the cup-shaped adjusting piston 42 is arranged movably in the housing bore 34, wherein the adjusting pressure chamber 10 is provided substantially within the adjusting piston 12. The housing 6 of the pressure control valve, which is secured in the housing bore 34 by means of a screw thread 44, projects partially into said adjusting pressure chamber 10. To pivot the swashplate 42 back, adjusting pressure medium emerges from the adjusting pressure port A and fills the adjusting pressure chamber 10, with the result that the adjusting piston 12 pivots the swashplate 42 back counter to the force of the adjusting spring 14.

Figure 3:
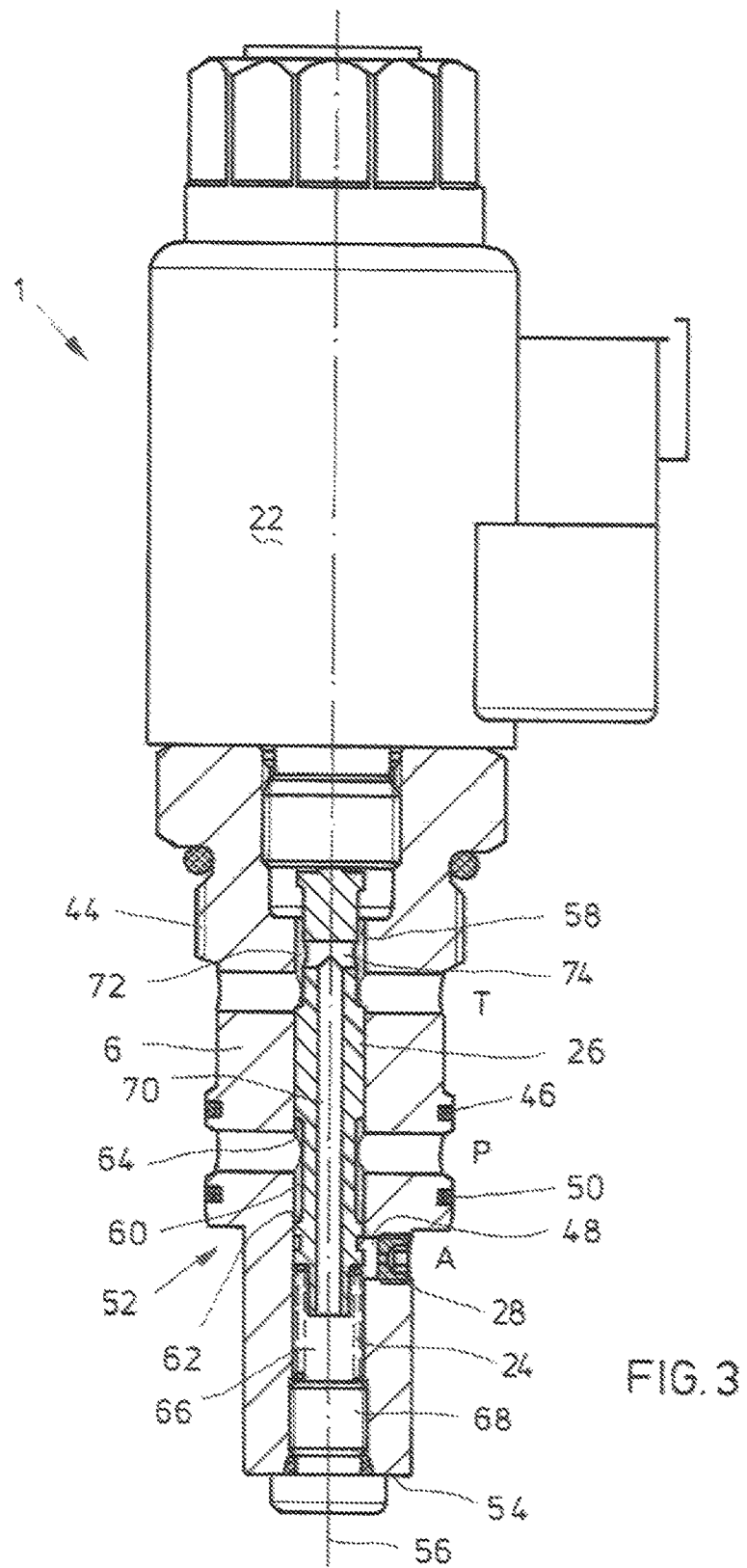
FIG. 3 shows the illustrative embodiment of the pressure control valve according to the disclosure shown in FIG. 2 in a first, partially sectioned illustration.

FIG. 3 shows the pressure limiting valve 1 according to the disclosure in a partially sectioned illustration. The housing 6 is designed as a screw-in cartridge and, for this purpose, has the screw thread 44. The tank port T and the pump port P are each formed by radial bores and separated from one another by a seal 46 on the outer circumference of the housing 6. The adjusting pressure port A is formed by a radial channel 48 and is separated from the pump port P by a seal 50 on the outer circumference of the housing 6. In this case, a radial step 52 is provided on the housing 6 between the seal 50 and the adjusting pressure port A. A section of the housing 6 of reduced diameter is thus obtained from the radial step 52 to an end 54. The adjusting piston 12 can be pushed over said section—especially in the case of a large pivoting angle of the swashplate 42—and therefore the overall length of the adjusting cylinder including the pressure control valve 1 is relatively short.

Along a longitudinal axis 56 of the pressure control valve 1, the valve plunger 26 is accommodated movably in a corresponding valve bore 58. A pump pressure chamber 60 is delimited by a larger collar 32 and by a smaller collar 34 of the valve plunger 26. The larger collar 32 acts counter to the force of the spring 24, while the smaller collar 64 acts in the direction of the force of the spring 24. The following balance of forces is thus obtained at the valve plunger 26:

$$F_{spring\ 24} = F_P + F_{electromagnet\ 22} = p_P \cdot A_{Diff} + F_{electromagnet\ 22}$$

In this case, F is various forces, $p_P$ is the pump pressure and $A_{Diff}$ is the differential area of the two collars 62, 64.

The spring 24 is arranged in a spring chamber 66 on the side of the valve piston 26 remote from the electromagnet 22 and is clamped between the valve plunger 26 and a closure screw 68, which is screwed sealingly into the end 54 of the housing 6. The preloading of the spring 24 can be adjusted by means of the closure screw 68. The spring chamber 66 is relieved to the tank port T via a longitudinal bore 70 and via a transverse bore 74 of the valve plunger 26, said transverse bore being arranged in a tank pressure chamber 72.

FIG. 3 shows the valve plunger 26 of the pressure limiting valve 1 in its normal position (a) (cf. FIG. 1) preloaded by the spring 24. In this case, the pump pressure chamber 60 is shut off by the larger collar 62 from the channel 48 leading to the adjusting pressure port A, with the result that the adjusting pressure port A is relieved to the tank port T via the channel 48, the spring chamber 66, the longitudinal bore 70, the transverse bore 74 and the tank pressure chamber 72.

When the valve plunger 26 is subjected to a force by the electromagnet 22 and/or by a comparatively high pump pressure at the pump port P, a connection from the pump pressure chamber 60, via the larger collar 62, to the adjusting pressure port A is opened, allowing the adjusting pressure medium diverted from the working line 18 (cf. FIG. 1) to flow via the channel 48 and, in a restricted manner, via the first nozzle 28 to the adjusting pressure port A. In this case, the first nozzle 28 is screwed into the radial channel 48.

Figure 4:
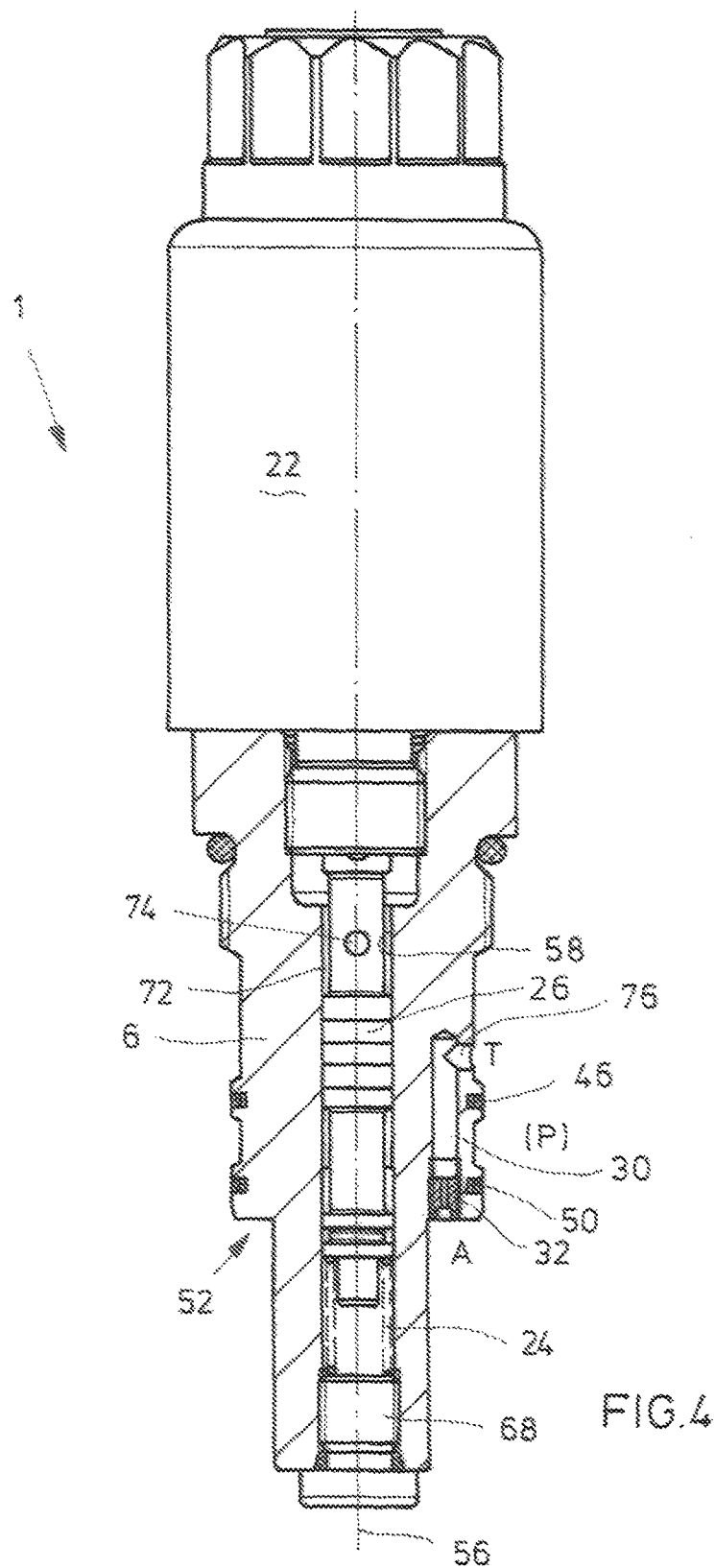
FIG. 4 shows the illustrative embodiment of the pressure control valve according to the disclosure shown in FIGS. 2 and 3 in a second, partially sectioned illustration.

FIG. 4 shows the pressure control valve 1 according to FIG. 3 in another partially sectioned illustration, wherein the section plane is arranged perpendicular to that in FIG. 3. In the illustration according to FIG. 4, the valve plunger 26 is not shown sectioned. In the illustration according to FIG. 4, it can be seen, in particular, that the channel 30 is introduced into the radial step 52 and into the annular end face thereby formed (cf. FIG. 1). This channel extends as an axial channel 30, parallel to the longitudinal axis 56, from the annular end face to a circumferential section of the housing 6 which, through the arrangement of seal 46, is associated with the tank port T. To be more precise, the axial channel 30 is furthermore connected by a radial channel section 76 to the tank port T. In the region of the annular end face of the step 52, the second nozzle 32 is screwed into the axial channel 30. Through the arrangement of seal 50, the annular end face of the step 52 is associated with the adjusting pressure port A. Thus, the nozzle 32 is arranged between the adjusting pressure port A and the tank port T of the pressure control valve 1.

A disclosure is made of an electroproportional pressure control valve of cartridge-type construction, which can be screwed into a housing bore of a hydrostatic pump. An adjusting pressure port, a pump port and a tank port are provided on the outer circumference of the cartridge. The adjusting pressure port is relieved to the tank port in a normal position, preloaded by a spring, of a valve plunger of the pressure control valve. A connection from the pump port to the adjusting pressure port can be opened counter to the force of the spring by increasing a current of an electromagnet and increasing the pump pressure at the pump port. In this case, the spring, the electromagnet and the resultant force of the pump pressure act along a common axis of movement of the valve plunger. A first nozzle is inserted into a first channel in the cartridge and connects the adjusting pressure port to an adjusting pressure chamber. The first nozzle is thus effective during filling and emptying of an adjusting device connected to the adjusting pressure port. A second nozzle is inserted into a second channel in the cartridge and connects the adjusting pressure port to the tank port. The second nozzle is thus effective during emptying of the adjusting device.

The invention claimed is:

1. A pressure control valve for a pressure-controlled adjustable hydrostatic pump, comprising:
    a valve housing defining a valve bore;
    a valve plunger guided in the valve bore;
    an electromagnet configured to act directly on the valve plunger to move the valve plunger within the valve bore; and
    an adjusting pressure port, a pump port, and a tank port defined in the valve housing,
    wherein the valve plunger is movable within the valve bore between a first position and a second position, the valve plunger being biased toward the first position by a spring,
    wherein, when the valve plunger is in the first position, the adjusting pressure port is relieved to the tank port and a connection between the pump port and the adjusting pressure port is blocked by the valve plunger,
    wherein the connection from the pump port to the adjusting pressure port is configured to be opened by moving the valve plunger counter to the force of the spring from the first position toward the second position by at least one of increasing a current of the electromagnet and increasing the pump pressure at the pump port, and wherein the pressure control valve is configured as a continuously adjustable 3/2-way valve and as a directly controlled pressure control valve, and further comprising a first nozzle arranged between the adjusting pressure port and an adjusting pressure chamber of an adjusting cylinder with respect to fluid flow, wherein a connection between the adjusting pressure port and the adjusting pressure chamber is open irrespective of a position of the valve plunger.

2. The pressure control valve according to claim 1, wherein the force of the spring, the resultant force of the pump pressure, and the force of the electromagnet act along a common longitudinal axis of the valve plunger.

3. The pressure control valve according to claim 1, wherein a pump pressure chamber is delimited by a larger collar and by a smaller collar of the valve plunger.

4. The pressure control valve according to claim 3, wherein the larger collar and the force of the electromagnet act counter to the smaller collar and the force of the spring.

5. The pressure control valve according to claim 1, wherein the first nozzle is inserted in a radial direction relative to the valve housing configured as a screw-in cartridge.

6. The pressure control valve according to claim 1, further comprising a second nozzle arranged between the adjusting pressure port and the tank port with respect to fluid flow, the second nozzle being inserted in an axial direction relative to the valve housing into a radial step of the valve housing configured as a screw-in cartridge, wherein a connection between the adjusting pressure port and the tank port via the second nozzle is open irrespective of a position of the valve plunger.

7. The pressure control valve according to claim 1, wherein the force of the spring is configured to be adjusted by a closure screw that is screwed into an end, remote from the electromagnet, of a housing configured as a screw-in cartridge.

8. The pressure control valve according to claim 1, wherein the valve plunger has a longitudinal bore, via which a tank pressure chamber and a spring chamber located at the end, in which the spring is arranged, are connected to one another.

9. A pump, comprising:
a housing with a housing bore; and
a pressure control valve inserted into the housing bore, the pressure control valve including:
  a valve housing defining a valve bore;
  a valve plunger guided in the valve bore;
  an electromagnet configured to act directly on the valve plunger to move the valve plunger within the valve bore; and
  an adjusting pressure port, a pump port, and a tank port defined in the valve housing,
wherein the valve plunger is movable within the valve bore between a first position and a second position, the valve plunger being biased toward the first position by a spring,
wherein, when the valve plunger is in the first position, the adjusting pressure port is relieved to the tank port and a connection between the pump port and the adjusting pressure port is blocked by the valve plunger,
wherein a connection from the pump port to the adjusting pressure port is configured to be opened by moving the valve plunger counter to the force of the spring from the first position toward the second position by at least one of increasing a current of the electromagnet and increasing the pump pressure at the pump port, and
wherein the pressure control valve is configured as a continuously adjustable 3/2-way valve and as a directly controlled pressure control valve, and
further comprising a first nozzle arranged between the adjusting pressure port and an adjusting pressure chamber of an adjusting cylinder with respect to fluid flow,
wherein a connection between the adjusting pressure port and the adjusting pressure chamber is open irrespective of a position of the valve plunger.

10. The pump according to claim 9, wherein the pump is of swashplate construction and configured as an axial piston pump, and wherein the housing bore is positioned obliquely to a drive shaft and a cylinder barrel.

11. The pump according to claim 10, wherein an adjusting piston coupled to a swashplate is guided in the housing bore, and wherein the adjusting piston and a housing of the pressure control valve, which is configured as a screw-in cartridge, delimit an adjusting pressure chamber.

12. The pump according to claim 11, wherein the adjusting piston is of cup-shaped configuration and, at the maximum pivoting angle of the swashplate, fits around an end, remote from the electromagnet, of the housing of the pressure control valve.

* * * * *